United States Patent [19]
Fuchs et al.

[11] Patent Number: 4,540,494
[45] Date of Patent: Sep. 10, 1985

[54] METHOD FOR THE REMOVAL OF OXYGEN DISSOLVED IN WATER

[75] Inventors: Wilfried Fuchs, Halle-Neustadt; Horst Richter, Bad Dürrenberg; Vendelin Kaufmann, Leuna; Wolfgang Renker, Leuna; Roland Kober, Leuna, all of German Democratic Rep.

[73] Assignee: VEB Leuna Werke "Walter Ulbricht", Leuna, German Democratic Rep.

[21] Appl. No.: 473,933

[22] Filed: Mar. 10, 1983

[51] Int. Cl.$^3$ ................................................ C02F 1/70
[52] U.S. Cl. .................................... 210/750; 210/754; 210/757; 252/389 A; 422/13; 422/16; 422/19; 423/219
[58] Field of Search ............... 210/750, 757, 696, 754; 252/389.53, 400.53; 422/13, 16, 19; 423/219

[56] References Cited

U.S. PATENT DOCUMENTS

| | | | |
|---|---|---|---|
| 4,022,711 | 5/1977 | Noack | 252/389.53 |
| 4,096,090 | 6/1978 | Noack | 252/389.53 |
| 4,287,072 | 9/1981 | Beecher | 210/757 |

FOREIGN PATENT DOCUMENTS

| | | | |
|---|---|---|---|
| 2232548 | 1/1974 | Fed. Rep. of Germany | 210/750 |
| 54-15484 | 2/1979 | Japan | 210/757 |

*Primary Examiner*—Peter Hruskoci
*Attorney, Agent, or Firm*—Jordan and Hamburg

[57] ABSTRACT

A method for removal of oxygen dissolved in water, especially from reservoir drinking water, and for preservation purposes based on hydrazine, having no organic activators and assuring a high reaction velocity with respect to dissolved oxygen within a broad pH-range at low temperature and without a time-dependent reduction of its effectiveness.

Cationic and anionic complexes of trivalent cobalt with inorganic ligands, or mixtures thereof, are used as activators. Preferred activators are $(Co(NH_3)_5Cl)Cl_2$ and $Na_3Co(NO_2)_6$.

Hydrazine solutions with these activators are suitable for the removal of oxygen from gases.

3 Claims, No Drawings

METHOD FOR THE REMOVAL OF OXYGEN DISSOLVED IN WATER

BACKGROUND OF THE INVENTION AND PRIOR ART STATEMENT

The invention relates to a method for the removal of oxygen from water, especially from reservoir drinking water, and for preservation purposes. It is generally known that oxygen dissolved in water corrodes steel. It is therefore necessary to protect containers, pipes, steam boilers, heat exchangers, and other parts from corrosion by adding a reducing agent and to maintain the corrosion protection at low temperatures during cut-off periods or when first put into operation. This applies to closed apparatus systems as well. The invention is especially suitable for use in low temperature zones and includes the removal of oxygen from gases containing oxygen.

Various methods are used for the removal of oxygen dissolved in water.

Sulfites are, for example, used as reducing agents. They have the disadvantage that they are oxidixzed into sulfates, which results in an undesired concentration of salt. Additionally, corrosive gases, such as sulfur dioxide, may develop at higher temperatures. For this reason, hydrazine has been used as a reducing agent for a long time, being converted into innocuous nitrogen by oxygen. It is disavantageous, however, that a satisfactory reduction occurs only at higher temperatures. This disadvantage has been eliminated by using activators, which are generally added to the aqueous, approximately 10-25%, hydrazine solution. Quinonoid compounds, aromatic diamines, aminophenols, sulfonic acids and heterocyclic compounds are especially noted (DE-PS 1 521 749, DE-PS 2 601 466, DE-PS 2 115 463). These activators are disadvantageous in that they have to be used in relatively high concentrations of approximately 0.1 to 0.3 volume weight percent and higher, in relation to the aqueous hydrazine solution, resulting in high expenses. Additionally disadvantageous is that organic compounds can diffuse into the vapor phase, causing complications when using vapor as processing vapor. A further disadvantage is that a narrow pH-range of 10.0 to 10.4 has to be maintained to assure high reaction velocity. Setting of the pH-value has to be ascertained by continuously adding alkali. Many of the suggested activators are too expensive for practical use.

It has further been suggested to use manganese, copper, cobalt or vanadium compounds (U.S. Pat. Nos. 4,022,711, 4,079,018, 3,764,548). These, however, have the disadvantage of low activity or can cause undesired corrosion themselves. Furthermore, they cause the hydrazine to decompose during storage. Even if one eliminates these disadvantages by adding complex compounds of these metals with organic ligands as complex constitutents by using, for example, cobalt maleic acid hydrazide (DE-PS 2,232,548) or cobalt (II)-complexes with 3,4-diaminotoluene, 1-amino-2-napthol-4-sulfonic acid, or pyrocatechin (DE-PS 2,639,955), there will still be the need for relatively high concentrations at high pH-values. Thus, the problem with organic components cannot be solved in this fashion.

Organic activators exhibit the additional serious disadvantage of having their effectiveness reduced in conjunction with the time involved during removal of the oxygen. Attempts have already been made at using inorganic activators by adding small amounts of iodine or bromine, or the salts of the acids of these elements, to the hydrazine solution (DE-PS 1 186 305). It is disadvantageous in that the water, the oxygen content of which is to be eliminated, has to be filtered through an active coal filter following mixing with active hydrazine in order to assure a satisfactory oxygen reduction, requiring additional expenditures. The low reaction velocity of hydrazine, activated by iodine or bromine, with oxygen dissolved in water, is an additional disadvantage.

It is an object of the invention to remove oxygen dissolved in water by using hydrazine as a reducing agent, as well as using activators which eliminate the necessity of using organic compounds as activators, the invention requiring very low activator amounts, having a broad pH-range, allowing the removal of oxygen at high reaction velocity without diminishing oxygen removal over time, allowing processing at low as well as at high temperatures, and eliminating the need to treat the aqueous phase with active coal.

It is the object of the invention to develop a suitable activator using hydrazine as a reducing agent for the removal of oxygen dissolved in water, with the activator containing no organic components, being effective in small quantities, assuring a high reaction velocity at low temperatures with a broad pH-range, and with the hydrazine not decomposing during storage and maintaining its effectiveness during the removal of oxygen with advancing time.

SUMMARY OF THE INVENTION

This object is accomplished by the invention in that small amounts of the complexes of trivalent cobalt with inorganic ligands as complex constituents, are added to the aqueous hydrazine solution as activators. Cationic or anionic cobalt(III) complexes, or mixtures of cationic and anionic cobalt(III) complexes, can be used with the same results. Sodium-hexanitrito-cobalt(III), cobalt-(III)-hexaminochloride, chloropentamine-cobalt(III)-chloride, carbonato-pentaminocobalt(III)-nitrate and potassium-trioxalate cobalt(III) are particularly suitable.

DETAILED DESCRIPTION OF PREFERRED EMBODIMENTS

These activators are either commercial products or can be inexpensively produced according to well-known methods of preparative inorganic chemistry. The activators are added to the aqueous hydrazine solution with a hydrazine content of the customary 10-25 volume percent, preferably 20 to 25 volume percent, in amounts of between 0.01 to 0.3 weight percent, preferably 0.05 to 0.1 weight percent. There is no decomposition of the activated hydrazines during storage in closed containers.

The method of the invention for the removal of oxygen from water is accomplished by adding the activator-rich hydrazine solution to water from which oxygen is to be removed, with the amount of hydrazine being at least one mol. per mol. of dissolved oxygen. An excess amount of hydrazine is preferably used. The pH-range should be between 8 and 11. Although high pH-values increase the reaction velocity, a rapid reduction of oxygen is already accomplished in a pH-range of approximately 9 and there is accordingly no need for adding alkalizing substances, such as alkali hydroxide or ammonia. This is a definite advantage compared to the prior art. The temperature can be maintained in the range of 283° K. to 303° K. Higher temperatures are preferable but not mandatory.

It has been demonstrated of particular advantage that the activators of the invention do not lose their effectiveness over time during the removal of oxygen.

Corrosion tests, which were conducted over a period of three months with steel probes dipped into water containing oxygen and activated hydrazine, or hydrazine without activator, or hydrazine with organic activator, being resupplied with oxygen twice a day by injecting air, have demonstrated that there is no corrosion effect when using the activators of the invention, while comparison probes already exhibited signs of corrosion after a few days, become increasingly worse with time.

Because of their high reactivity, a hydrazine solution containing the activators of the invention can preferably be used as well for the removal of oxygen from gases containing oxygen, provided that the hydrazine content is adjusted to the amount of oxygen in the gas. It is thus possible to virtually completely eliminate the oxygen content of air by shaking with an activator-rich hydrazine solution in a closed container at room temperature. The mentioned characteristics are particularly desirable in those instances when unexpected air intrusion is to be compensated in closed systems.

EXAMPLES OF EXECUTION

Example 1

0.5 to 3 g. of activator per liter was dissolved in an aqueous hydrazine solution with a content of 200 g. hydrazine per liter. From the resulting activator-rich solution, 1 ml was added to a liter of water which had been in contact with air, the water containing 5 to 6 mg of oxygen per liter. The mixture was immediately transferred to a measuring device to determine the amount of oxygen. The pH-value of the oxygen-containing water was regulated with alkali and remeasured after adding the activated hydrazine. The tests were performed at 293° K. The results are illustrated in Table 1.

Example 2

An activator-rich hydrazine solution prepared in accordance with Example 1 with 1 g. of activator per liter was mixed into oxygen-containing water as described. After reduction of the dissolved oxygen, the water was gassed for 10 minutes by adding air, again provided with oxygen. This process was repeated several times. The oxygen content was determined immediately after gassing and again after a 10 minute reaction time. For comparison purposes, hydrazine solutions with organic activators and iodine were tested in the same way. The results are illustrated in Table 2.

Example 3

500 ml of water was added to a closable retort, containing air with a capacity of 2,000 ml with 15 ml of activated hydrazine having been added to the water, and with the hydrazine containing 1 g. of activator per liter. The solution in the retort had an initial concentration of 6 g. hydrazine per liter. After closing the retort, it was shaken for one hour at room temperature. Thereafter, a sample was taken from the gas phase and examined for its oxygen content, in accordance with well-known methods. The oxygen content in the remaining air dropped to 12.5 volume percent when using hydroquinone, to 6.5 volume percent when using hexaminocobalt(III)-chloride, to 6 volume percent when using sodium hexanitritocobalt(III) and to 14 volume percent when using commercial products with organic activators.

TABLE 1

| Activator | Activator concentration in g/l | pH-value | $O_2$-concentration following 10 min. reaction time in mg $O_2$/l |
|---|---|---|---|
| 1. $(Co(NH_3)_6Cl_3$ | 0.5 | 10.6 | 3.3 |
| | 1.0 | 10.6 | 2.6 |
| | 1.6 | 10.6 | 1.8 |
| | 2.1 | 10.6 | 1.8 |
| | 2.7 | 10.6 | 1.7 |
| 2. $(Co(NH_3)_5Cl)Cl_2$ | 1.0 | 10.6 | 1.6 |
| | 1.0 | 9.4 | 3.0 |
| 3. $(Co(NH_3)_5CO_3)NO_3$ | 1.1 | 10.6 | 0.3 |
| | 1.1 | 9.3 | 2.5 |
| 4. $Na_3(Co(NO_2)6)$ | 1.6 | 10.6 | 1.2 |
| | 1.6 | 9.3 | 2.5 |
| | 2.0 | 10.5 | 0.8 |
| | 3.0 | 10.5 | 0.2 |
| 5. Mixture of 1 and 4 ratio 1:1 | 1.5 | 10.5 | 2.7 |
| | 1.5 | 9.4 | 3.0 |
| 6. Iodine | 0.02 | 10.8 | 4.3 |
| | 0.2 | 10.8 | 4.3 |
| | 1.0 | 10.8 | 4.3 |
| 7. without | — | 10.4 | 5.2 |

TABLE 2

| Activator | pH-value | $O_2$ content before adding hydrazine in mg/l | $O_2$ content following 10 min reaction time | $O_2$ content following 1st gassing | $O_2$ content following 10 min reaction time | $O_2$ content following 2nd gassing | $O_2$ content following 10 min reaction time |
|---|---|---|---|---|---|---|---|
| 1 | 10.4 | 5.0 | 1.8 | 2.2 | 0.05 | 1.7 | 0.02 |
|   | 9.3  | 4.9 | 3.5 | 3.5 | 2.0  | 2.5 | 1.0 |
| 2 | 10.5 | 5.0 | 1.5 | 3.1 | 0.3  | 2.2 | 0.05 |
|   | 9.5  | 5.0 | 2.5 | 2.9 | 0.5  | 1.8 | 0.1 |
|   | 8.6  | 5.1 | 3.3 | 4.2 | 2.9  | 4.0 | 1.5 |
| 3 | 10.5 | 5.1 | 0.2 | 2.2 | 0.5  | 3.5 | 1.8 |
|   | 9.5  | 4.5 | 2.7 | 4.4 | 3.5  | 4.4 | 4.3 |
| 4 | 0.5  | 4.6 | 0.2 | 1.1 | 0.2  | 2.0 | 0.4 |
|   | 9.5  | 4.7 | 1.7 | 4.1 | 3.2  | 4.3 | 4.0 |
| 5 | 10.5 | 4.5 | 4.5 | 4.6 | 4.5  | 4.8 | 4.8 |
|   | 9.5  | 4.5 | 4.4 | 4.5 | 4.5  | 4.7 | 4.7 |

| Activator | pH-value | $O_2$ content following 3rd gassing | $O_2$ content following 10 min reaction time | $O_2$ content following 4th gassing | $O_2$ content following 10 min reaction time | $O_2$ content following 5th gassing | $O_2$ content following 10 min. reaction time |
|---|---|---|---|---|---|---|---|
| 1 | 10.4 | 1.5 | 0.02 | 2.1 | 0.02 | 2.0 | 0.02 |
|   | 9.3  | 2.2 | 0.5  | 2.2 | 0.2  | 2.2 | 0.05 |
| 2 | 10.5 | 1.9 | 0.02 | 1.8 | 0.02 | 1.9 | 0.02 |
|   | 9.5  | 1.0 | 0.02 | 0.8 | 0.02 | 0.9 | 0.02 |
|   | 8.6  | 3.1 | 0.3  | 2.4 | 0.1  | 2.3 | 0.1 |

TABLE 2-continued

| | | | | | | | |
|---|---|---|---|---|---|---|---|
| 3 | 10.5 | 4.4 | 4.1 | 4.7 | 4.4 | 4.3 | 4.5 |
| | 9.5 | 4.5 | 4.3 | 4.4 | 4.3 | 4.4 | 4.3 |
| 4 | 10.5 | 2.8 | 3.3 | 4.4 | 4.2 | 4.5 | 4.4 |
| | 9.5 | 4.6 | 4.4 | 4.5 | 4.3 | 4.6 | 4.4 |
| 5 | 10.5 | 4.9 | 4.9 | 5.1 | 5.1 | 5.1 | 5.1 |
| | 9.5 | 4.8 | 4.8 | 5.0 | 5.0 | 5.1 | 5.1 |

1 = $(Co(NH_3)_6)Cl_3$
2 = $Na_3(Co(NO_2)_6)$
3 = Commercial product with organic activator system
4 = Hydroquinone
5 = Iodine

We claim:

1. A process for the removal of oxygen dissolved in water by improving the activity of hydrazine as an oxygen removal agent which comprises adding an effective amount of hydrazine and a trivalent cobalt complex selected from the group consisting of sodium hexanitritocobalt (III), cobalt (III) hexaminochloride, chloropentamine cobalt (III) chloride, carbonatopentamino cobalt (III) nitrate, and mixtures thereof, to oxygen-containing water, about 0.01 to 0.3% by weight of cobalt complex being added to an aqueous solution comprising about 10 to 25% by volume of hydrazine, said cobalt complex and hydrazine being added to said oxygen-containing water at a pH of about 8 to 11.

2. The process of claim 1 wherein said oxygen-containing water is at a temperature of 283° K. to 303° K.

3. The process of claim 1 wherein 0.05 to 0.1% by weight of cobalt complex is added to an aqueous solution comprising 20 to 25% by volume of hydrazine.

* * * * *